United States Patent
Chen et al.

(10) Patent No.: US 7,752,711 B1
(45) Date of Patent: Jul. 13, 2010

(54) HINGE AND AN ELECTRONIC DEVICE WITH THE HINGE

(75) Inventors: Hsiang-Chi Chen, Shulin (TW); Chia-Hsiang Chen, Shulin (TW); Weiming Chen, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 47 days.

(21) Appl. No.: 12/344,184

(22) Filed: Dec. 24, 2008

(51) Int. Cl.
*E05D 11/10* (2006.01)
(52) U.S. Cl. ........................................................ 16/347
(58) Field of Classification Search ................... 16/367;
361/679.06, 679.07; 248/291.1, 183.1, 278.1;
455/575.3, 575.1, 90.3; 348/373, 333.06,
348/794
See application file for complete search history.

(56) References Cited

U.S. PATENT DOCUMENTS 7,237,304 B2 * 7/2007 Duan et al. .................... 16/324
2006/0215359 A1 * 9/2006 Mizuno et al. ............... 361/683
2008/0078056 A1 * 4/2008 Hsu et al. ...................... 16/280
2008/0078060 A1 * 4/2008 Chen ............................ 16/367
2008/0120805 A1 * 5/2008 Su ............................... 16/239
2009/0229080 A1 * 9/2009 Chen ............................ 16/295
2010/0005626 A1 * 1/2010 Wang et al. .................. 16/367

* cited by examiner

*Primary Examiner*—Victor Batson
*Assistant Examiner*—Matthew Sullivan
(74) *Attorney, Agent, or Firm*—patenttm.us (57) ABSTRACT

A hinge is mounted between a cover and a base of an electronic device. A lid covers the hinge and is attached securely to the base. The hinge has two tilting brackets, two tilting shafts, two linking assemblies and two actuating washers. Each tilting bracket has a mounting wing with an elongated hole and a mounting hole and a connecting wing with an abutting surface. The tilting shafts are mounted movably through the elongated holes. Each linking assembly has an actuating seat mounted around the tilting shaft, a holding seat formed on the actuating seat and protruding into the mounting hole and a resilient element mounted in the mounting hole and pressing against the holding seat. The actuating washers are mounted securely around the tilting shafts and selectively abut the abutting surfaces of the connecting wings to lift up the cover.

16 Claims, 9 Drawing Sheets

HINGE AND AN ELECTRONIC DEVICE WITH THE HINGE

BACKGROUND OF THE INVENTION

The present invention relates to a hinge and an electronic device with the hinge, especially to the hinge that is mounted between the cover and the base of the electronic device, and the hinge lifts up the cover while the cover is pivoted.

DESCRIPTION OF THE PRIOR ARTS

Figure 9:
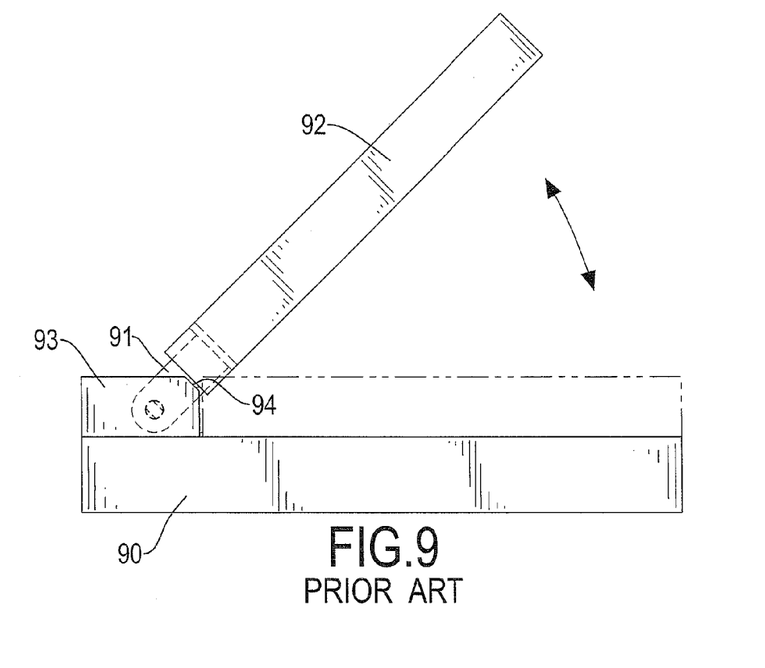
FIG. 9 is an operational side view of a conventional electronic device in accordance with the prior art.
Figure 10:
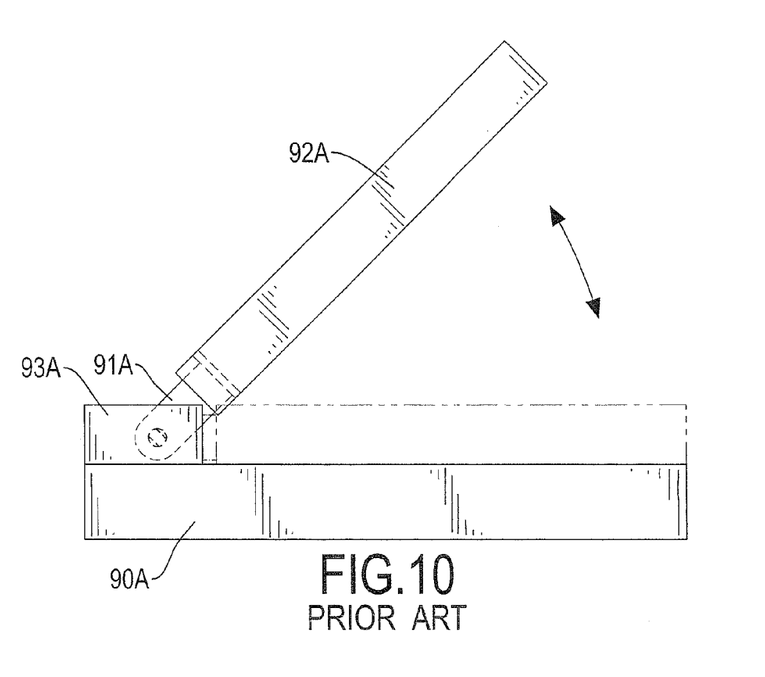
FIG. 10 is an operational side view of another conventional electronic device in accordance with the prior art.

With reference to FIGS. 9 and 10, a conventional electronic device, such as a cell phone and a notebook computer, has a base (90, 90A), a cover (92, 92A), a conventional hinge (91, 91A) and a lid (93, 93A). The conventional hinge (91, 91A) is mounted between the base (90, 90A) and the cover (92, 92A) to allow the cover (92, 92A) pivoting relative to the base (90, 90A). The lid (93, 93A) is mounted on the base (90, 90A) and covers the conventional hinge (91, 91A) to ornament the conventional electronic device.

When the cover (92, 92A) is pivoted relative to the base (90, 90A), the lid (93, 93A) interfere with the end of the cover (92, 92A) to keep the cover (92, 92A) from pivoting. To solve the interference between the cover (92, 92A) and the lid (93, 93A), two conventional ways are shown as follows:

One conventional electronic device is shown in FIG. 9. The end of the lid (93) near the cover (92) has an inclined surface (94). The cover (92) is pivoted along the inclined surface (94) so that the lid (93) does not block the cover (92). However, the inclined surface (94) disfigures the entire appearance of the conventional electronic device.

Another conventional electronic device is shown in FIG. 10. A gap is formed between the cover (92A) and the lid (93A). Therefore, the cover (92A) is kept away from the lid (93A) when the cover (92A) is pivoted. However, the gap not only disfigures the appearance of the conventional electronic device but also increase the volume of the conventional electronic device.

Thus, the conventional ways to solve the interference between the cover (92, 92A) and the lid (93, 93A) disfigure the appearance of the conventional electronic device and increase the volume of the conventional electronic device. To disfigure the appearance of the conventional electronic device and to increase the volume of the conventional electronic device are against the need of the market.

To overcome the shortcomings, the present invention provides a hinge and an electronic device with the hinge to mitigate or obviate the aforementioned problems.

SUMMARY OF THE INVENTION

The main objective of the present invention is to provide a hinge and an electronic device with the hinge that lifts up the cover as desired. The hinge is mounted between a cover and a base of the electronic device. A lid covers the hinge and is attached securely to the base. The hinge has two tilting brackets, two tilting shafts, two linking assemblies and two actuating washers. Each tilting bracket has a mounting wing with an elongated hole and a mounting hole and a connecting wing with an abutting surface. The tilting shafts are mounted movably through the elongated holes. Each linking assembly has an actuating seat mounted around the tilting shaft, a holding seat formed on the actuating seat and protruding into the mounting hole and a resilient element mounted in the mounting hole and pressing against the holding seat. The actuating washers are mounted securely around the tilting shafts and selectively abut the abutting surfaces of the connecting wings to lift up the cover.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
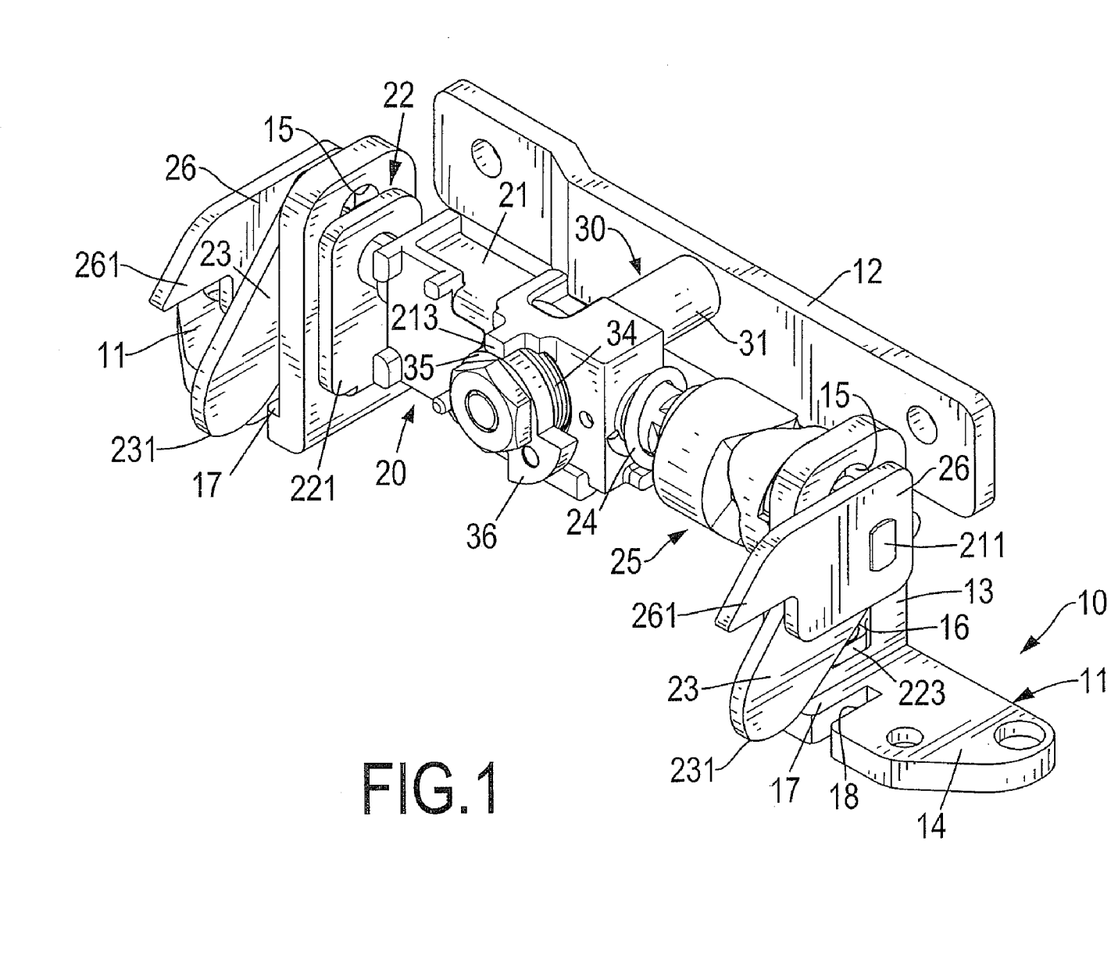
FIG. 1 is a perspective view of a hinge in accordance with the present invention.
Figure 2:
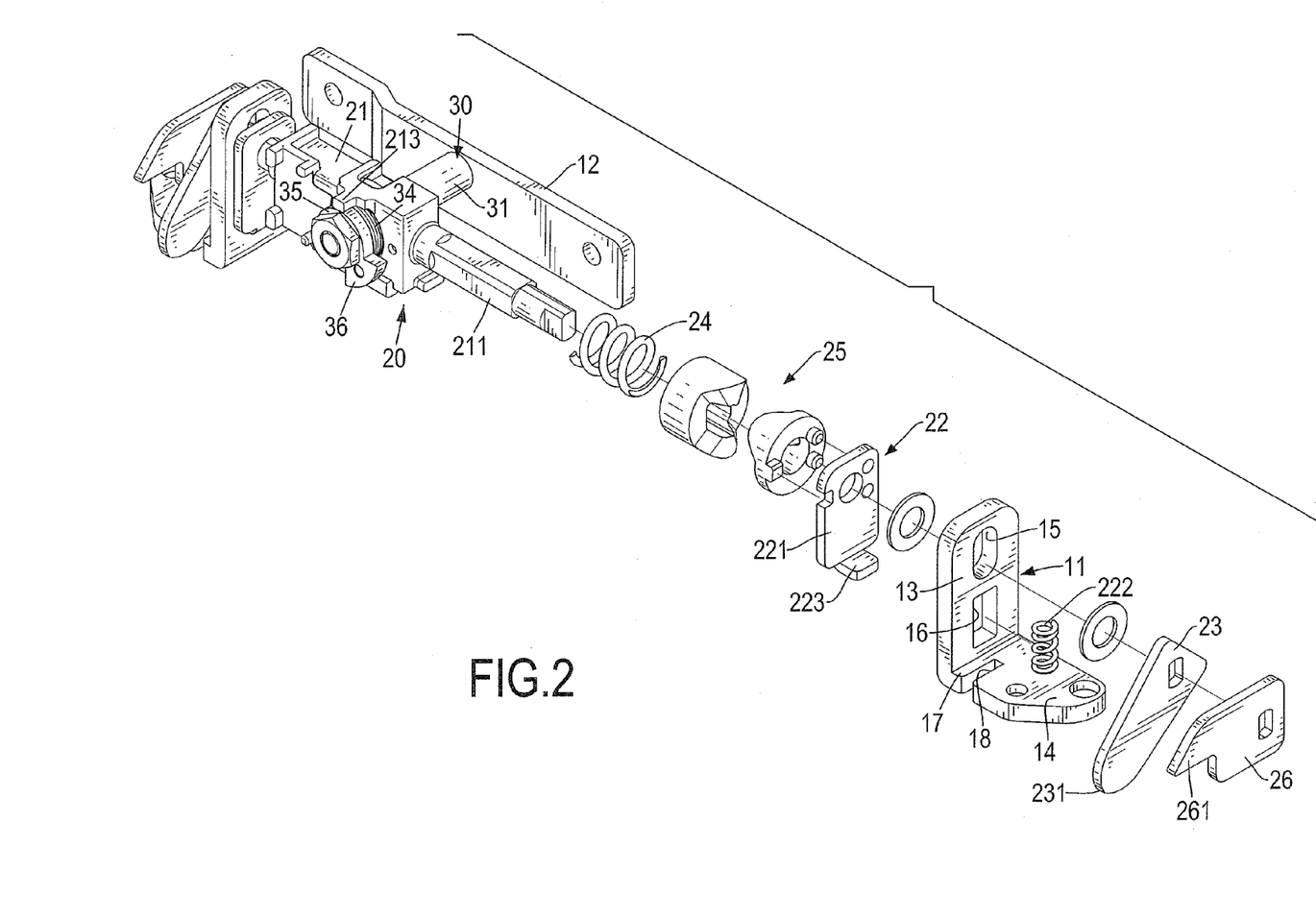
FIG. 2 is a partially exploded perspective view of the hinge in FIG. 1.
Figure 3:
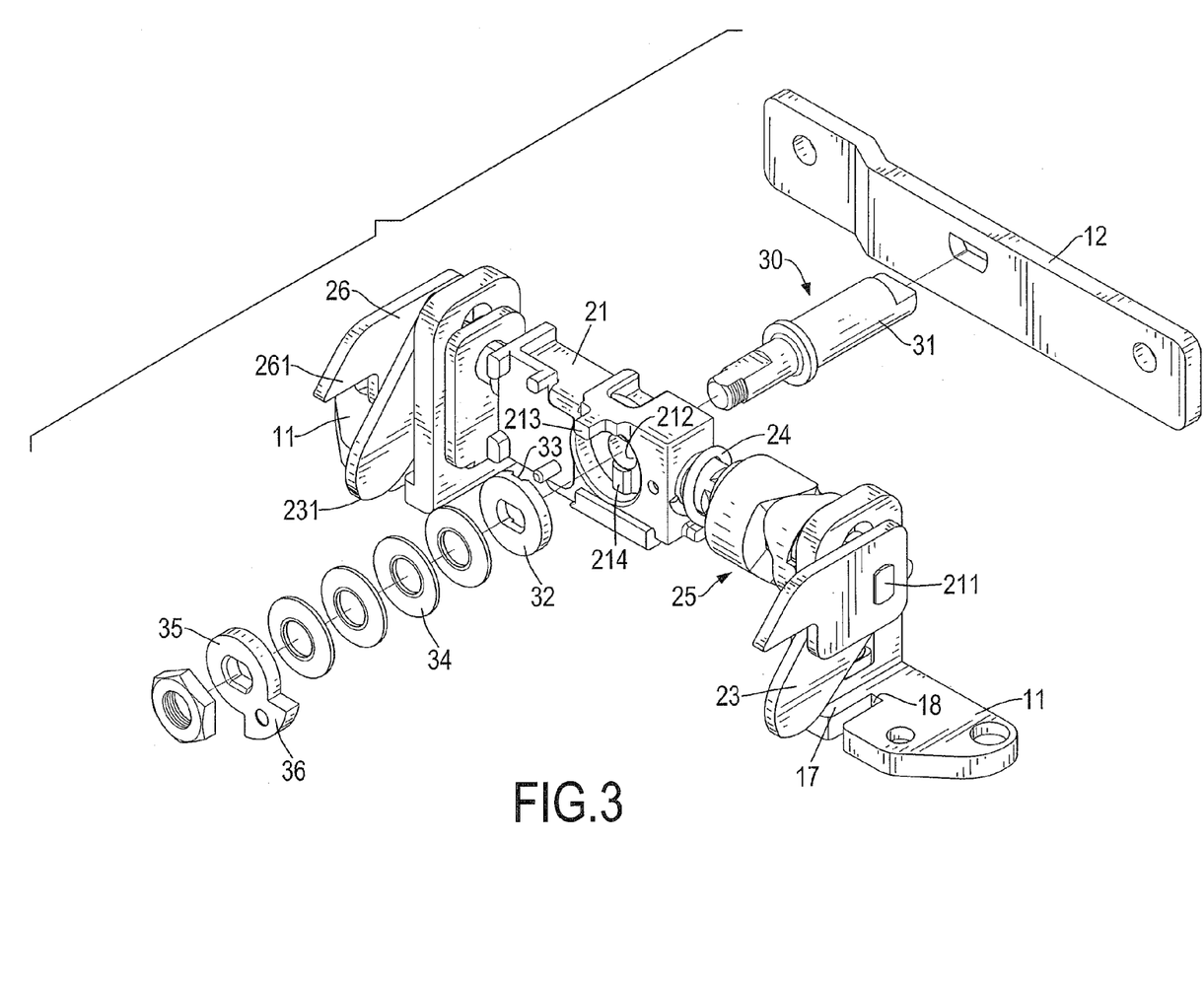
FIG. 3 is another partially exploded perspective view of the hinge in FIG. 1.
Figure 4:
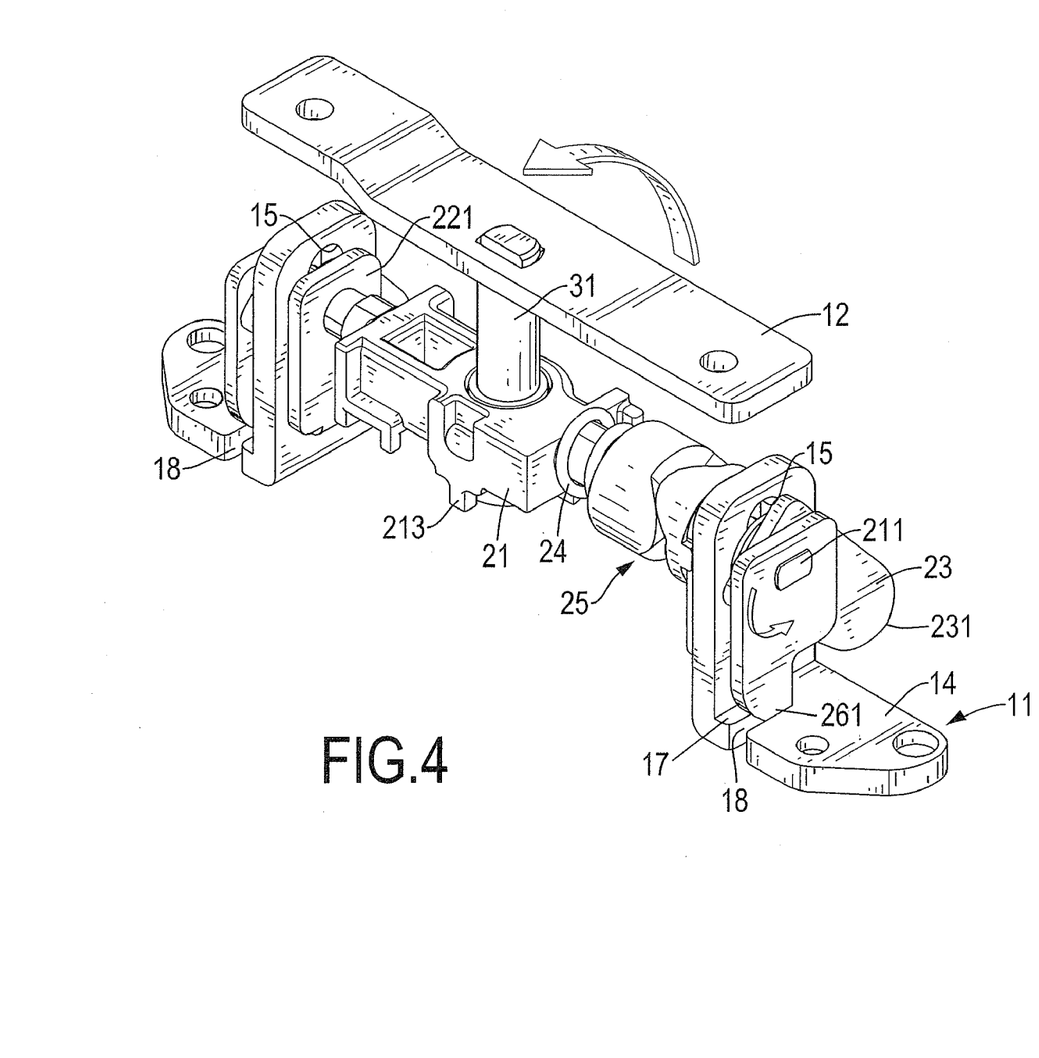
FIG. 4 is an operational perspective view of the hinge in FIG. 1, showing the hinge pivoted along transverse axis.

With reference to FIGS. 1 to 3, a hinge in accordance with the present invention comprises a bracket assembly (10), a tilting assembly (20) and a rotating assembly (30).

The bracket assembly (10) has two tilting brackets (11) and a rotating bracket (12).

Each tilting bracket (11) has a mounting wing (13) and a connecting wing (14). The mounting wing (13) has a side edge, an elongated hole (15) and a mounting hole (16). The elongated hole (15) is formed through the mounting wing (13). The mounting hole (16) is formed through the mounting wing (13) and is adjacent to the elongated hole (15). The connecting wing (14) is formed on and protrudes from the side edge of the mounting wing (13), may be perpendicular with the mounting wing (13) and has an abutting surface (17) and a limiting recess (18). The abutting surface (17) is connected to the side edge of the mounting wing (13). The limiting recess (18) is formed in the abutting surface (17) of the connecting wing (14).

The tilting assembly (20) is connected to the bracket assembly (10) and comprises a central frame (21), two tilting shafts (211), a spring (24), a positioning assembly (25), two linking assemblies (22), two actuating washers (23) and two fastening rings (26).

The central frame (21) is mounted between tilting brackets (11) and has a first end, a second end, a first side, a second side, a pivoting hole (212), a limiting protrusion (213) and two positioning protrusions (214). The second end is opposite to the first end. The second side is opposite to the first side and is adjacent to the first and second ends. The pivoting hole (212) is formed through the first and second sides of the central frame (21). The limiting protrusion (213) is formed on and protrudes longitudinally from the second side. The positioning protrusions (214) are formed on the second side and are adjacent to the pivoting hole (212).

The tilting shafts (211) are formed respectively on and protrude transversely from the first and second ends of the central frame (21) and are mounted respectively and movably through the elongated holes (15) of the tilting brackets (11). Each tilting shaft (211) may have a non-circular shape in cross section.

The spring (24) is mounted around a corresponding tilting shaft (211).

The positioning assembly (25) is mounted around a corresponding titling shaft (211) against the spring (24) to provide positioning function. The positioning assembly (25) may comprise a rotating positioning washer and a stationary positioning washer that rotate relative to each other and have corresponding positioning protrusions and positioning detent.

The linking assemblies (22) are connected respectively to the tilting shafts (211) and the mounting wings (13). Each linking assembly (22) has an actuating seat (221), a holding seat (223) and a resilient element (222). The actuating seat (221) is mounted around a corresponding tilting shaft (211) and has a proximal edge. The holding seat (223) is formed on and protrudes out from the proximal edge of the actuating seat (221) and protrudes into and selectively slides in the mounting hole (16) of the mounting wing (13) of a corresponding tilting bracket (11). The resilient element (222) is mounted in the mounting hole (16) of the mounting wing (13) of the corresponding tilting bracket (11) and presses against the holding seat (223).

The actuating washers (23) are respectively mounted securely around the tilting shafts (211) and respectively correspond to the connecting wings (14). Each actuating washer (23) has an abutting edge (231) and may have a non-circular hole configured to match the shape of the corresponding tilting shaft (211). The abutting edge (231) is curved and selectively abuts the abutting surface (17) of the connecting wing (14) of the corresponding tilting bracket (11) to lift up the corresponding tilting shaft (211), the actuating seat (221) and the holding seat (223).

The fastening rings (26) are fastened respectively on the tilting shafts (211) and respectively correspond to the connecting wings (14) of the tilting brackets (11). Each fastening ring (26) has an annular edge and a limiting protrusion (231). The limiting protrusion (231) is formed transversely on the annular edge of the fastening ring (26) and selectively abuts the limiting recess (18) of the connecting wing (14) of the corresponding tilting bracket (11) to limit the rotating angle of the tilting shaft (211).

Figure 5:
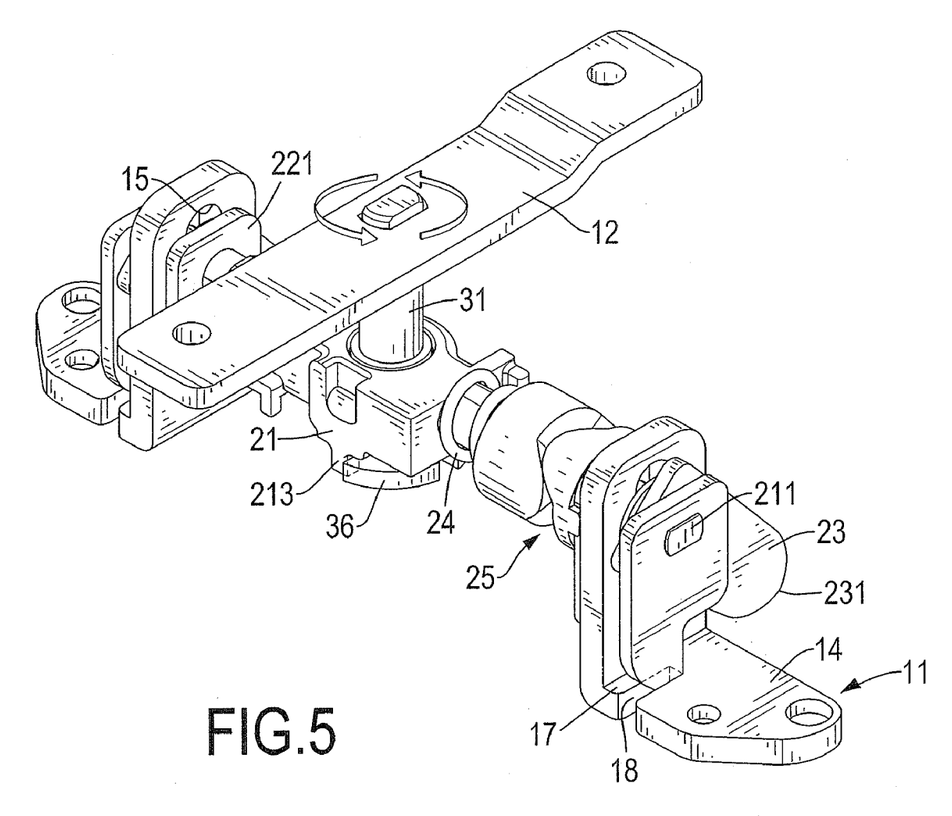
FIG. 5 is another operational perspective of the hinge in FIG. 1, showing the hinge pivoted along longitudinal axis.

With further reference to FIG. 5, the rotating assembly (30) is connected to the tilting assembly (20) and comprises a rotating shaft (31), a positioning washer (32), multiple resilient washers (34), a limiting ring (35) and a fastening ring.

The rotating shaft (31) is longitudinally mounted rotatably through the central frame (21), is preferably mounted rotatably through the pivoting hole (212) of the central frame (21), is attached securely to the rotating bracket (12) and protrudes through the second side of the central frame (21). The rotating shaft (31) may have a non-circular shape in cross section and may have a threaded outer wall.

The positioning washer (32) is mounted slidably around the rotating shaft (31), has an abutting surface and two positioning recesses (33) and may have a central hole configured to match the shape of the rotating shaft (31). The abutting surface of the positioning washer (32) faces the second side of the central frame (21). The positioning recesses (33) are formed in the abutting surface of the positioning washer (32) and selectively engage the positioning protrusions (214) of the central frame (21) to provide positioning function.

The resilient washers (34) are mounted around the rotating shaft (31) and abut the positioning washer (32).

The limiting ring (35) is mounted around the rotating shaft (31), has an annular edge, a limiting protrusion (36) and may have a central hole configured to match the shape of the rotating shaft (31). The limiting protrusion (36) is formed transversely on the annular edge of the limiting ring (35) and selectively abuts the limiting protrusion (213) of the central frame (21) to limit the rotating angle of the rotating shaft (31).

The fastening ring is mounted securely around the rotating shaft (31) to hold the limiting ring (35), the resilient washers (34) and the positioning washer (32) and may be a nut being screwed onto the threaded outer wall of the rotating shaft (31).

Figure 6:
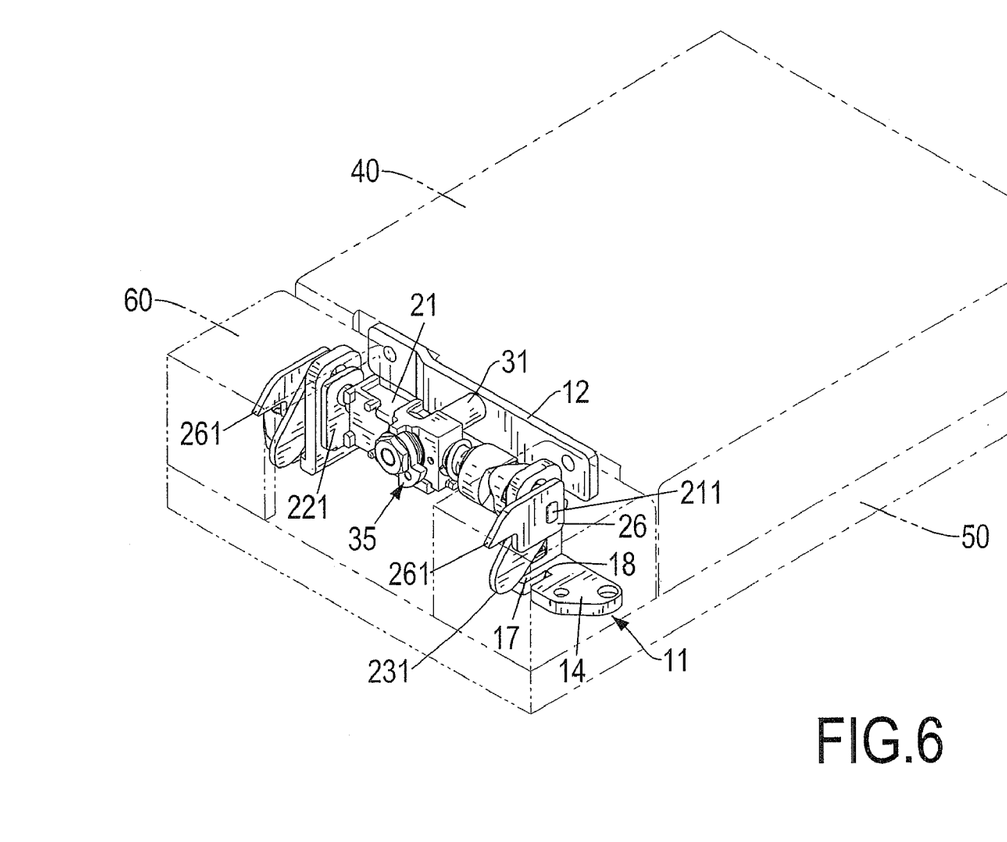
FIG. 6 is a perspective view of an electronic device in accordance with the present invention with the hinge in FIG. 1.
Figure 7:
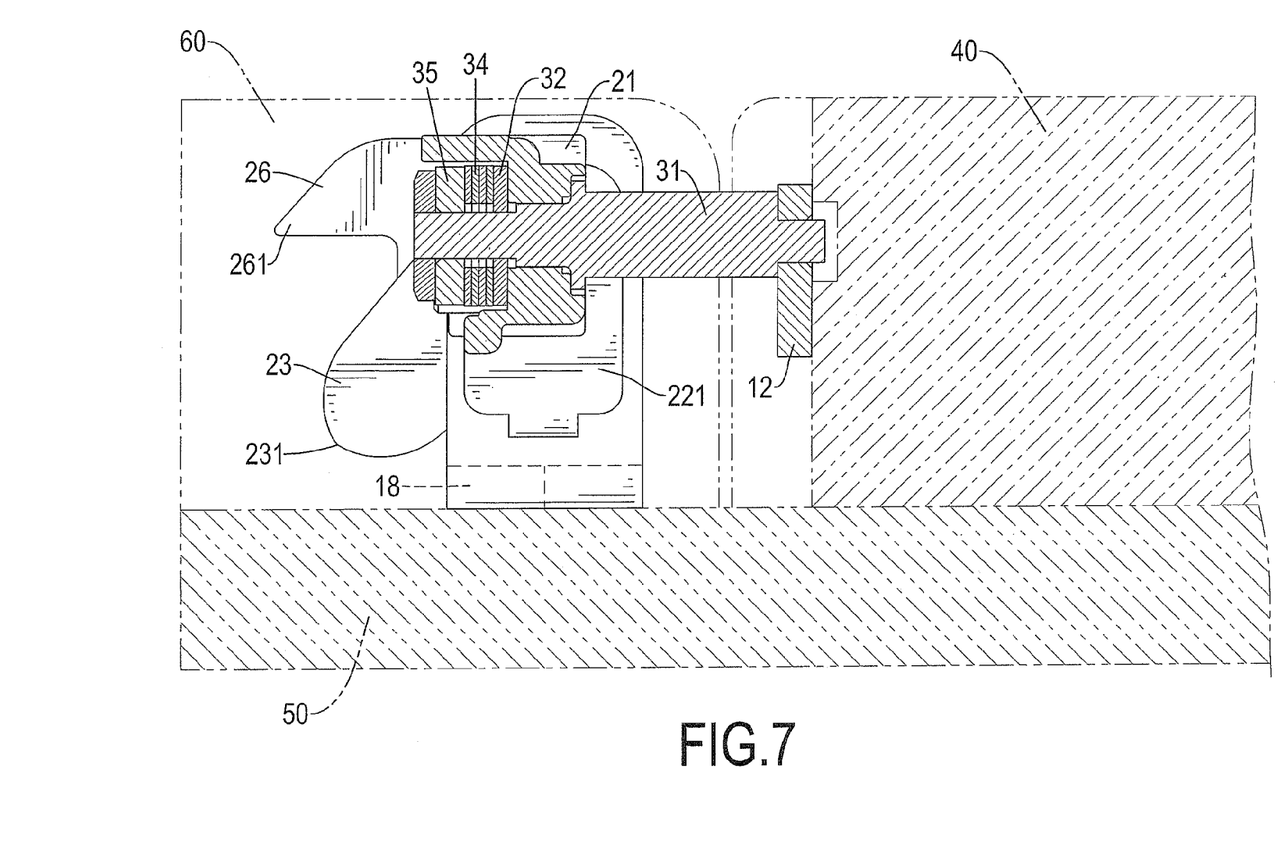
FIG. 7 is an enlarged side view in partial section of the electronic device in FIG. 6.

With further reference to FIGS. 6 and 7, an electronic device in accordance with the present invention comprises a cover (40), a base (50), a hinge as described and a lid (60). The cover (40) is connected pivotally to the base (50). The hinge as described is mounted between the cover (40) and the base (50). The rotating shaft (31) is connected securely to the cover (40) or the rotating bracket (12) may be attached securely to the cover (40). The tilting brackets (11) are attached securely to the base (50). The lid (60) covers the hinge as described and is attached securely to the base (50).

Figure 8A:
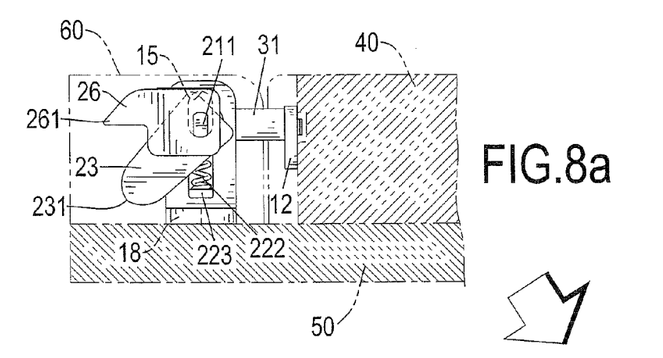
FIGS. 8a, 8b and 8c are operational side views in partial section of the electronic device in FIG. 6.
Figures 8B, 8C:
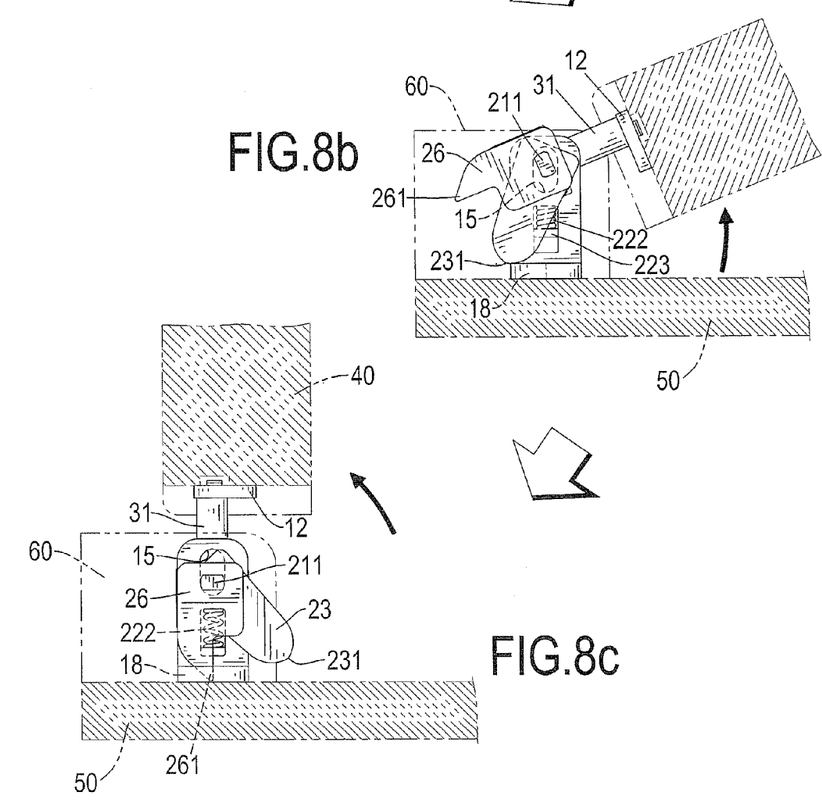

With further reference to FIGS. 8a, 8b and 8c, the cover (40) is pivoted relative to the base (50). When the cover (40) brings the rotating shaft (31) and the central frame (21) to pivot relative to the tilting brackets (11), the actuating washers (23) are also rotated by the tilting shafts (211). When the abutting edges (231) of the actuating washers (23) abut the abutting surfaces (17) of the connecting wings (14), the actuating washers (23) are simultaneously moved upward to pull the tilting shafts (211) upward. The tilting shafts (211) respectively slide in the elongated holes (15) of the mounting wings (13) to gradually lift up the cover (40). Because the cover (40) is lifted up to be distant from the lid (60), the cover (40) does not bump against the lid (60) when the cover (40) is pivoted.

When the tilting shafts (211) are moved upward, the actuating seats (221) and the holding seats (223) are also moved upward, and which compresses the resilient elements (222). When the cover (40) is continuously pivoted, the abutting edges (231) of the actuating washers (23) leaves the abutting surfaces (17) so that the force pushing the tilting shafts (211) to move upward is released. Then the resilient elements (222) press the holding seats (223) to slide. The actuating seats (221) are pushed to slide the tilting shafts (211) to the original position. Therefore, the cover (40) is brought back to the original position.

The hinge and the electronic device as described have following advantages. The hinge smoothly lifts the cover (40) up when the cover (40) is pivoted to a certain angle. Therefore, the shape of the electronic device does not need to be disfigured and the cover (40) still does not bump against the lid (60). Furthermore, the electronic device as described can be sized small and can be shaped exquisitely without influence the smoothness when the cover (40) is pivoted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a bracket assembly having two tilting brackets, and each tilting bracket having
      a mounting wing having
         a side edge;
         an elongated hole being formed through the mounting wing; and
         a mounting hole being formed through the mounting wing and being adjacent to the elongated hole; and
      a connecting wing being formed on and protruding from the side edge of the mounting wing and having an abutting surface being connected to the side edge of the mounting wing;
   a tilting assembly being connected to the bracket assembly and comprising
      a central frame being mounted between tilting brackets and having
         a first side;
         a second side being opposite to the first side;
         a first end;
         a second end being opposite to the first end and adjacent to the first and second sides
      two tilting shafts being formed respectively on and protruding transversely from the first and second ends of the central frame and being mounted respectively and movably through the elongated holes of the tilting brackets;
      two linking assemblies being connected respectively to the tilting shafts and the mounting wings, and each linking assembly corresponding to one tilting shaft and the mounting wing of one tilting bracket and having
         an actuating seat being mounted around the corresponding tilting shaft and having a proximal edge;
         a holding seat being formed on and protruding out from the proximal edge of the actuating seat and protruding into and selectively sliding in the mounting hole of the mounting wing of the corresponding tilting bracket; and
         a resilient element being mounted in the mounting hole of the mounting wing of the corresponding tilting bracket and pressing against the holding seat; and
      two actuating washers being respectively mounted securely around the tilting shafts, and each actuating washer corresponding to one tilting shaft and the connecting wing of one tilting bracket and having
         an abutting edge being curved and selectively abutting the abutting surface of the connecting wing of the corresponding tilting bracket to lift up the actuating seat, the holding seat and the corresponding tilting shaft; and
   a rotating assembly being connected to the tilting assembly and comprising a rotating shaft being longitudinally mounted rotatably through the central frame and protruding through the second side of the central frame.

2. The hinge as claimed in claim 1, wherein the bracket assembly has a rotating bracket being attached securely to the rotating shaft of the rotating assembly.

3. The hinge as claimed in claim 1, wherein
   the connecting wing of each tilting bracket has a limiting recess being formed in the abutting surface of the connecting wing; and
   the tilting assembly has two fastening rings being fastened respectively on the tilting shafts and respectively corresponding to the connecting wings of the tilting brackets, and each fastening ring having
      an annular edge; and
      a limiting protrusion being formed transversely on the annular edge of the fastening ring and selectively abutting the limiting recess of the connecting wing of the corresponding tilting bracket.

4. The hinge as claimed in claim 2, wherein
   the connecting wing of each tilting bracket has a limiting recess being formed in the abutting surface of the connecting wing; and
   the tilting assembly has two fastening rings being fastened respectively on the tilting shafts and respectively corresponding to the connecting wings of the tilting brackets, and each fastening ring having
      an annular edge; and
      a limiting protrusion being formed transversely on the annular edge of the fastening ring and selectively abutting the limiting recess of the connecting wing of the corresponding tilting bracket.

5. The hinge as claimed in claim 1, wherein the tilting assembly has a spring being mounted around a corresponding tilting shaft; and
   a positioning assembly being mounted around a corresponding titling shaft against the spring to provide positioning function.

6. The hinge as claimed in claim 4, wherein the tilting assembly has a spring being mounted around a corresponding tilting shaft; and
   a positioning assembly being mounted around a corresponding titling shaft against the spring to provide positioning function.

7. The hinge as claimed in claim 1, wherein
   the central frame of the tilting assembly has
      a pivoting hole being formed through the first and second sides of the central frame;
      a limiting protrusion being formed on and protruding longitudinally from the second side of the central frame; and
      two positioning protrusions being formed on the second side and being adjacent to the pivoting hole of the central frame; and
   the rotating assembly has
      a positioning washer being mounted slidably around the rotating shaft and having
         an abutting surface facing the second side of the central frame; and
         two positioning recesses being formed in the abutting surface of the positioning washer and selectively engaging the positioning protrusions of the central frame;
      multiple resilient washers being mounted around the rotating shaft and abutting the positioning washer;
      a limiting ring being mounted around the rotating shaft and having
         an annular edge; and
         a limiting protrusion being formed transversely on the annular edge of the limiting ring and selectively abutting the limiting protrusion of the central frame; and
      a fastening ring mounted securely around the rotating shaft to hold the limiting ring, the resilient washers and the positioning washer.

8. The hinge as claimed in claim 6, wherein
   the central frame of the tilting assembly has
      a pivoting hole being foamed through the first and second sides of the central frame;

a limiting protrusion being formed on and protruding longitudinally from the second side of the central frame; and two positioning protrusions being formed on the second side and being adjacent to the pivoting hole of the central frame; and the rotating assembly has a positioning washer being mounted slidably around the rotating shaft and having an abutting surface facing the second side of the central frame; and two positioning recesses being formed in the abutting surface of the positioning washer and selectively engaging the positioning protrusions of the central frame;

multiple resilient washers being mounted around the rotating shaft and abutting the positioning washer;

a limiting ring being mounted around the rotating shaft and having an annular edge; and a limiting protrusion being formed transversely on the annular edge of the limiting ring and selectively abutting the limiting protrusion of the central frame; and a fastening ring mounted securely around the rotating shaft to hold the limiting ring, the resilient washers and the positioning washer.

9. An electronic device comprising:

a base;

a cover being connected pivotally to the base;

a hinge being connected between the base and the cover and comprising a bracket assembly having two tilting brackets, and each tilting bracket being attached securely to the base having a mounting wing having a side edge;

an elongated hole being formed through the mounting wing; and a mounting hole being formed through the mounting wing and being adjacent to the elongated hole; and a connecting wing being formed on and protruding from the side edge of the mounting wing and having an abutting surface being connected to the side edge of the mounting wing;

a tilting assembly being connected to the bracket assembly and comprising a central frame being mounted between tilting brackets and having a first side;

a second side being opposite to the first side;

a first end;

a second end being opposite to the first end and adjacent to the first and second sides two tilting shafts being formed respectively on and protruding transversely from the first and second ends of the central frame and being mounted respectively and movably through the elongated holes of the tilting brackets;

two linking assemblies being connected respectively to the tilting shafts and the mounting wings, and each linking assembly corresponding to one tilting shaft and the mounting wing of one tilting bracket and having an actuating seat being mounted around the corresponding tilting shaft and having a proximal edge;

a holding seat being formed on and protruding out from the proximal edge of the actuating seat and protruding into and selectively sliding in the mounting hole of the mounting wing of the corresponding tilting bracket; and a resilient element being mounted in the mounting hole of the mounting wing of the corresponding tilting bracket and pressing against the holding seat; and two actuating washers being respectively mounted securely around the tilting shafts, and each actuating washer corresponding to one tilting shaft and the connecting wing of one tilting bracket and having an abutting edge being curved and selectively abutting the abutting surface of the connecting wing of the corresponding tilting bracket to lift up the actuating seat, the holding seat and the corresponding tilting shaft; and a rotating assembly being connected to the tilting assembly and comprising a rotating shaft being longitudinally mounted rotatably through the central frame, protruding through the second side of the central frame and being connected securely to the cover; and a lid covering the hinge and being attached securely to the base.

10. The electronic device as claimed in claim 9, wherein the bracket assembly has a rotating bracket being attached securely to the rotating shaft of the rotating assembly.

11. The electronic device as claimed in claim 9, wherein the connecting wing of each tilting bracket has a limiting recess being formed in the abutting surface of the connecting wing; and the tilting assembly has two fastening rings being fastened respectively on the tilting shafts and respectively corresponding to the connecting wings of the tilting brackets, and each fastening ring having an annular edge; and a limiting protrusion being formed transversely on the annular edge of the fastening ring and selectively abutting the limiting recess of the connecting wing of the corresponding tilting bracket.

12. The electronic device as claimed in claim 10, wherein the connecting wing of each tilting bracket has a limiting recess being formed in the abutting surface of the connecting wing; and the tilting assembly has two fastening rings being fastened respectively on the tilting shafts and respectively corresponding to the connecting wings of the tilting brackets, and each fastening ring having an annular edge; and a limiting protrusion being formed transversely on the annular edge of the fastening ring and selectively abutting the limiting recess of the connecting wing of the corresponding tilting bracket.

13. The electronic device as claimed in claim 9, wherein the tilting assembly has a spring being mounted around a corresponding tilting shaft; and a positioning assembly being mounted around a corresponding titling shaft against the spring to provide positioning function.

14. The electronic device as claimed in claim 12, wherein the tilting assembly has a spring being mounted around a corresponding tilting shaft; and a positioning assembly being mounted around a corresponding titling shaft against the spring to provide positioning function.

15. The electronic device as claimed in claim 9, wherein the central frame of the tilting assembly has a pivoting hole being formed through the first and second sides of the central frame;

a limiting protrusion being formed on and protruding longitudinally from the second side of the central frame; and two positioning protrusions being formed on the second side and being adjacent to the pivoting hole of the central frame; and the rotating assembly has a positioning washer being mounted slidably around the rotating shaft and having an abutting surface facing the second side of the central frame; and two positioning recesses being formed in the abutting surface of the positioning washer and selectively engaging the positioning protrusions of the central frame;

multiple resilient washers being mounted around the rotating shaft and abutting the positioning washer;

a limiting ring being mounted around the rotating shaft and having an annular edge; and a limiting protrusion being formed transversely on the annular edge of the limiting ring and selectively abutting the limiting protrusion of the central frame; and a fastening ring mounted securely around the rotating shaft to hold the limiting ring, the resilient washers and the positioning washer.

16. The electronic device as claimed in claim 14, wherein the central frame of the tilting assembly has a pivoting hole being formed through the first and second sides of the central frame;

a limiting protrusion being formed on and protruding longitudinally from the second side of the central frame; and two positioning protrusions being formed on the second side and being adjacent to the pivoting hole of the central frame; and the rotating assembly has a positioning washer being mounted slidably around the rotating shaft and having an abutting surface facing the second side of the central frame; and two positioning recesses being foamed in the abutting surface of the positioning washer and selectively engaging the positioning protrusions of the central frame;

multiple resilient washers being mounted around the rotating shaft and abutting the positioning washer;

a limiting ring being mounted around the rotating shaft and having an annular edge; and a limiting protrusion being formed transversely on the annular edge of the limiting ring and selectively abutting the limiting protrusion of the central frame; and a fastening ring mounted securely around the rotating shaft to hold the limiting ring, the resilient washers and the positioning washer.

* * * * *